United States Patent
Lu et al.

(10) Patent No.: US 8,652,622 B2
(45) Date of Patent: Feb. 18, 2014

(54) POLYIMIDE FILM LAMINATE AND METAL LAMINATE EMPLOYING THE SAME

(75) Inventors: Charng-Shing Lu, Hsinchu (TW); Si-Yi Chin, Hsinchu (TW); Shur-Fen Liu, Hsinchu County (TW); Jinn-Shing King, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 211 days.

(21) Appl. No.: 13/158,703

(22) Filed: Jun. 13, 2011

(65) Prior Publication Data

US 2012/0156459 A1 Jun. 21, 2012

(30) Foreign Application Priority Data

Dec. 15, 2010 (TW) ............................... 99143930 A

(51) Int. Cl.
B32B 7/02 (2006.01)
(52) U.S. Cl.
USPC .................. 428/212; 428/458; 428/473.5
(58) Field of Classification Search
USPC .................. 428/212, 411.1, 458, 473.5
See application file for complete search history.

(56) References Cited

U.S. PATENT DOCUMENTS

| | | | |
|---|---|---|---|
| 5,078,936 A | 1/1992 | Parish et al. | |
| 6,346,298 B1 * | 2/2002 | Takahashi et al. | 427/409 |
| 7,071,030 B2 * | 7/2006 | Jiang et al. | 438/108 |
| 8,101,038 B2 * | 1/2012 | Lu et al. | 156/244.24 |
| 2006/0127686 A1 | 6/2006 | Meloni | |
| 2006/0229403 A1 * | 10/2006 | Takahashi et al. | 524/495 |

FOREIGN PATENT DOCUMENTS

| | | |
|---|---|---|
| CN | 1777639 A | 5/2006 |
| JP | 8283456 | 10/1996 |
| JP | 9137060 | 5/1997 |
| TW | 201006866 A | 2/2010 |
| WO | WO 2010/050202 | 5/2010 |

OTHER PUBLICATIONS

Geon Woong Lee et al., "Enhanced thermal conductivity of polymer composites filled with hybrid filler", *Elsevier*, Composites: Part A 37 (2006) pp. 727-734.
Shu-Hui Xie et al., "Preparation and properties of polyimide/aluminum nitride composites", *Elsevier*, Polymer Testing 23 (2004) pp. 797-801.
Yunsheng Xu et al., "Thermally conducting aluminum nitride polymer-matrix composites", *Elsevier*, Composites: Part A 32 (2001) pp. 1749-1757.
Official Action issued on Dec. 11, 2013, by the Chinese Patent Office in corresponding Chinese Patent Application No. 201010614965.1.

* cited by examiner

*Primary Examiner* — Mark Ruthkosky
*Assistant Examiner* — Lawrence Ferguson
(74) *Attorney, Agent, or Firm* — Muncy, Geissler, Olds & Lowe, P.C.

(57) ABSTRACT

The disclosure provides a polyimide film laminate and a metal clad laminate employing the same. The polyimide film laminate includes a first polyimide film, a second polyimide film disposed on the first polyimide film, and a third polyimide film disposed on the second polyimide film. Particularly, the first polyimide film has a thermal conductivity of between about 0.2-0.9 watts/m·K and a breakdown voltage greater than about 3KV, the second polyimide film has a thermal conductivity of more than about 1 watts/m·K, and the third polyimide film has a thermal conductivity of between about 0.2-0.9 watts/m·K and a breakdown voltage greater than about 3KV.

18 Claims, 2 Drawing Sheets

POLYIMIDE FILM LAMINATE AND METAL LAMINATE EMPLOYING THE SAME

CROSS REFERENCE TO RELATED APPLICATIONS

This application is based upon and claims the benefit of priority from the prior Taiwan Patent Application No. 099143930, filed on Dec. 15, 2010, the entire contents of which are incorporated herein by reference.

BACKGROUND

1. Technical Field

The disclosure relates to a polyimide film laminate and a metal clad laminate employing the same, and in particular relates to a polyimide film laminate with high thermal conductivity and voltage breakdown resistance and a metal clad laminate employing the same.

2. Related Art

The trend for manufacturing electronic devices is towards lighter weights, lower volumes, and easier portability. Accordingly, the integration density of electronic devices has drastically increased. Therefore, electronic devices are developed to have high power, high response rates, and small volumes, resulting in devices with highly non-uniform and massive heat flux. Polyimide can be used to serve as an insulation layer of flexible metal foil substrates due to its excellent thermal resistance, electrical properties, and mechanical properties. In order to solve the heat dissipation issue of high-integrated and high-performance electronic devices and increase the reliability and operating life of the electronic devices, an insulation layer with high thermal conductivity, which provides a short thermal path for heat transfer, is required.

U.S. Pub. No. 2006/0127686(A1) discloses a polyimide film including inorganic particles such as aluminum oxide, silicon oxide, boron nitride, boron oxide covered by aluminum nitride, aluminium powder, silicon dioxide, silicon carbide, aluminium nitride, titanium dioxide, calcium phosophide, or barium titanium. The inorganic particle has a weight percentage of 40~85 wt %, and the polyimide films as disclosed in the embodiments exhibit a thermal conductivity of less than 1.0 about watts/m·K.

JP 9137060 (A) discloses the use of boron nitride or aluminum nitride to increase thermal conductivity of a polyimide film. The filler has an average particle size of 0.1 to 10 micrometers, and a resulting polyimide film has a thermal conductivity ranging from 0.2 to 0.6 watts/meter·K.

U.S. Pat. No. 5,078,936 teaches the use of carbon black to enhance the conductivity of the polyimide film; however, both the thermal conductivity and electric conductivity are also increased, wherein applications thereof are restricted to applications which require electric conduction.

As disclosed above, although the conventional polyimide film employing inorganic fillers has improved thermal conductivity, the undesired properties (such as dielectric constant, dielectric loss, and hardness) of the polyimide film are also simultaneously increased. Particularly, an increased rigidity of the polyimide film with high-content fillers will limit its practical applications (for example: poor film-forming ability). Further, a polyimide film with high-conductive fillers (such as nanotube, carbon black, carbon fiber, or graphite) exhibits not only high thermal conductivity but also high electric conductivity, thereby losing the electrical insulating properties of polymeric resin.

SUMMARY

An exemplary embodiment of a polyimide film laminate is provided and includes a first polyimide film, wherein the first polyimide film has a thermal conductivity of between about 0.2-0.9 watts/m·K and a breakdown voltage greater than 3 KV. A second polyimide film is formed on the first polyimide film, wherein the second polyimide film has a thermal conductivity of more than about 1 watts/m·K, and a third polyimide film is formed on the second polyimide film, wherein the third polyimide film has a thermal conductivity of between about 0.2-0.9 watts/m·K, and has a breakdown voltage greater than 3 KV.

In another exemplary embodiment of the disclosure, the disclosure provides a metal clad laminate, including a first metal layer and the aforementioned polyimide film laminate, wherein the polyimide film laminate is disposed on the first metal layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
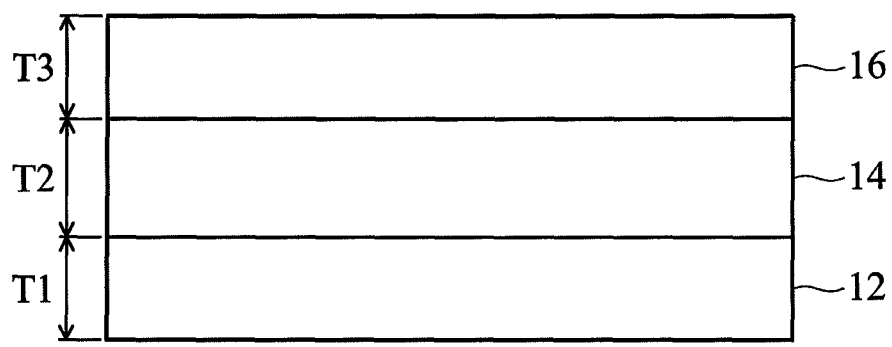
FIG. 1 is a cross-section of a polyimide film laminate according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a polyimide film laminate including multi layered polyimide films exhibiting high thermal conductivity and improved voltage breakdown resistance.

Please refer to FIG. 1, the polyimide film laminate 10 includes a first polyimide film 12, a second polyimide film 14 disposed on the first polyimide film, and a third polyimide film 16 disposed on the second polyimide film. The first polyimide film 12 has a thickness T1, the second polyimide film has a thickness T2, and the third polyimide film has a thickness T3, wherein the thickness T1, thickness T2, and thickness T3 are defined by the following equations: $0.5 < T2/T1 < 10$, and $0.5 < T2/T3 < 10$.

If the thickness T1, thickness T2, and thickness T3 fail to meet the condition of the aforementioned equations, the polyimide film laminate 10 may not exhibit high thermal conductivity and high electrical insulation property simultaneously. Namely, the obtained polyimide film laminate will not have a thermal conductivity of more than 1.5 about watts/m·K and a breakdown voltage of less than about 3 KV simultaneously.

Further, the thickness T1 of the first polyimide film 12 and the thickness T3 of the third polyimide film 16 can be the same or different. The thickness T1 of the first polyimide film 12 may be between about 7-20 μm, and the thickness T3 of the third polyimide film 16 may be between about 7-20 μm. If the first polyimide film 12 (or the third polyimide films 16) has a thickness of more than 20 µm, the polyimide film laminate 10 will have a thermal conductivity of less than about 1.5 watts/m·K; If the first polyimide film 12 (or the third polyimide films 16) has a thickness of less than 7 µm, the first polyimide film 12 (or the third polyimide films 16) will have a breakdown voltage of less than 3 KV. The thickness of the polyimide film laminate 10 (i.e. The sum of T1, T2, and T3) is less than 60 µm. If the thickness of the polyimide film laminate 10 has a thickness of more than 60 µm, the polyimide film laminate 10 will likely be more fragile.

The first polyimide film 12 is made of a polyimide resin and can further include a thermal conductive filler, wherein the thermal conductive filler has a weight percentage of 0.1-60 wt %, based on the total weight of the polyimide resin and the thermal conductive filler. If the weight percentage of the thermal conductive filler is 0.1-30 wt %, the first polyimide film 12 will exhibit sufficient flexibility. If the weight percentage of the thermal conductive filler is 30-60 wt %, the first polyimide film 12 will exhibit poor flexibility.

The first polyimide film 12 can be made by coating of a first polyimide composition. The first polyimide composition includes a polyamic acid resin, a solvent, and the thermal conductive filler. The polyamic acid resin of the disclosure can be prepared by reacting a dianhydride monomer with a diamine monomer, and the polyimide resin can be prepared by reacting the polyamic acid resin via a thermal imidization process. The dianhydride monomer can be selected from a group consisting of pyromellitic dianhydride (PMDA), 3,3',4,4'-Biphenyl tetracarboylic dianhydride (s-BPDA), 1,4,5,8-Naphthalenetetracarboxylicdianhydride (NTCDA), 3,3',4,4'-benzophenone-tetracarboxylic dianhydride (BTDA), 4,4'-oxydiphthalic anhydride (ODPA), hydroquinnone diphtalic anhydride (HQDA), 4,4'-bisphenol A dianhydride (BPADA), 2,2'-bis-(3,4-dicarboxyphenyl)hexafluoropropane dianhydride (6FDA), 1,3-dihydro-1,3-dioxo-5-isobenzofurancarboxylic acid phenylene ester (TAHQ), and 3,3',4,4'-Diphenylsulfone tetracarboxylic dianhydride (DSDA) and combinations thereof. The diamine monomer can be selected from a group consisting of p-phenylene diamine (P-PDA), 4,4'-oxydianiline (4,4'-ODA), 3,4'-Oxydianiline (3,4'-ODA), 3,3'-dihydroxy-4,4'-diamino-biphenyl (HAB), 4,4'-diaminodiphenyl sulfone (4,4'-DDS), 2,2'-bis(4-aminophenyl)hexafluoropropane, Bis-A-AF), 2,2-Bis(4-[4-aminophenoxy]phenyl)propane (BAPP), 2,2-Bis(4-[3-aminophenoxy]phenyl)sulfone (BAPS), 1,4-Bis(4-aminophenoxy)benzene (TPE-Q), 1,3-Bis(4-aminophenoxy)benzene (TPE-R), 1,3-Bis(3-aminophenoxy)benzene, (APB), 4,4'-Bis(4-aminophenoxy)biphenyl (BAPB), 1,4'-Bis(4-aminophenoxy)-2,5-di-t-butylbenzene (DTBAB), 4,4'-Bis(4-aminophenoxy) benzophenone (BAPK), and diamino siloxane, and combinations thereof. The solvent can be aprotic polar organic solvent such as N-methyl-2-pyrrolidone (NMP), N,N-dimethylacetamide (DMAc), γ-butyrolactone (GBL), xylene, and toluene, or a co-solvent thereof.

Further, the thermal conductive filler includes boron nitride, aluminium nitride, or aluminium sesquioxide, or combinations thereof, wherein the thermal conductive filler has a particular size of 60 nm-2.0 µm. It would be noted that, the first polyimide film has a thermal conductivity of between about 0.2-0.9 watts/m·K, and has a breakdown voltage greater than 3 KV, resulting in the polyimide film laminate having a high voltage breakdown resistance.

The second polyimide film 14 includes a polyimide resin, a thermal conductive carbon material, and a thermal conductive filler, wherein the weight percentage of the thermal conductive carbon material and the thermal conductive filler is 10-50 wt %, based on the weight of the second polyimide film. Further, the weight ratio between the thermal conductive filler and the thermal conductive carbon material is between about 10:90 and 50:50. Further, in order to maintain high conductivity of the polyimide film laminate, the ratio between the thermal conductive filler and the thermal conductive carbon material is preferable not more than 1. The second polyimide film 14 can be made by coating of a second polyimide composition. The second polyimide composition includes a polyamic acid resin, a solvent, the thermal conductive carbon material, and the thermal conductive filler. The polyamic acid resin and the thermal conductive filler employed by the second polyimide composition can be the same as those of the first polyimide composition. The thermal conductive filler includes boron nitride, aluminium nitride, or aluminium sesquioxide, or combinations thereof. In an embodiment of the disclosure, the thermal conductive carbon material includes a nanotube, a carbon fiber, and a graphite, and can be carbon fiber (vapor grown carbon fiber, VGCF). The thermal conductive carbon material can have a diameter of 20 nm-0.5 µm, and have an aspect ratio of more than 5. The second polyimide film has a thermal conductivity of more than about 1 watts/m·K, thereby ensuring high thermal conductivity of the polyimide film laminate.

The third polyimide film 16 includes a polyimide resin, and can further include a thermal conductive filler, wherein the thermal conductive filler has a weight percentage of 0.1-60 wt %, based on the total weight of the polyimide resin and the thermal conductive filler. If the weight percentage of the thermal conductive filler is 0.1-30 wt %, the third polyimide film 16 will exhibit sufficient flexibility. If the weight percentage of the thermal conductive filler is 30-60 wt %, the third polyimide film 16 will exhibit poor flexibility.

The first polyimide film 12 can be made by coating of a third polyimide composition. The third polyimide composition includes a polyamic acid resin, a solvent, and the thermal conductive filler. The polyamic acid resin of the disclosure can be prepared by reacting a dianhydride monomer with a diamine monomer, and the polyimide resin can be prepared by reacting the polyamic acid resin via a thermal imidization process.

The polyamic acid resin and the thermal conductive filler of the third polyimide composition can be the same as those of the first polyimide composition. It would be noted that, the third polyimide film has a thermal conductivity of between about 0.2-0.9 watts/m·K, and has a breakdown voltage greater than about 3 KV, resulting in the polyimide film laminate having a high voltage breakdown resistance. Further, the first polyimide film 12 and the third polyimide film 16 can be the same of different.

Figure 2:
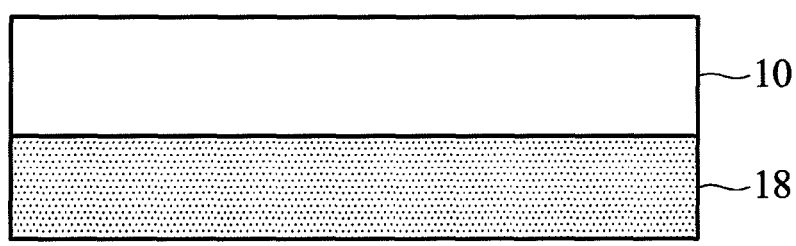
FIG. 2 is a cross-section of a copper clad laminate according to an embodiment of the disclosure.
Figure 3:
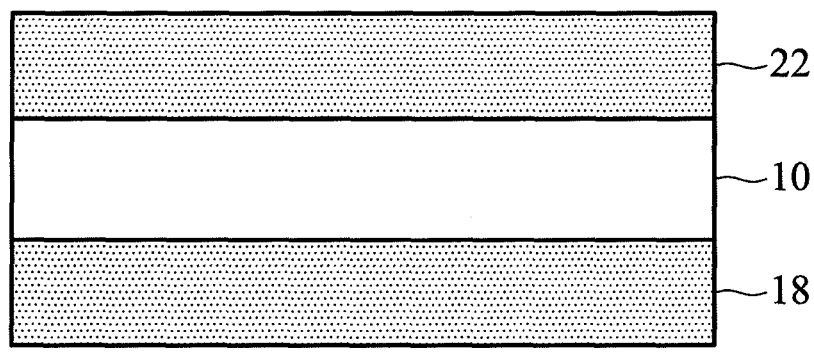
FIG. 3 is a cross-section of a double-sided flexible copper clad laminate according to an embodiment of the disclosure.

According to some embodiments of the disclosure, shown in FIG. 2, the polyimide film laminate 10 of the disclosure can be further disposed on a metal layer 18, to form a metal clad laminate, such as a copper clad laminate 20. Further, shown in FIG. 3, another metal layer 22 can be disposed on the polyimide film laminate 10 of the metal clad laminate 20, obtaining a double-sided flexible copper clad laminate 30. The metal layer includes a copper foil, an aluminum foil, a stainless steel foil, or a nickel foil.

The following examples are intended to illustrate the disclosure more fully without limiting the scope of the disclosure, since numerous modifications and variations will be apparent to those skilled in this art.

Preparation of Polyamic Acid Resin

PREPARATION EXAMPLE 1

0.0799 mole (34.5568 g) of 2,2-Bis(4-[3-aminophenoxy]phenyl)sulfone (BAPS) and 0.0799 mole (15.98 g), 4,4'-oxydianiline (4,4'-ODA) were added into a 1000 ml reaction bottle, and dissolved by a co-solvent of N-methyl-2-pyrrolidone and Toluene (400 g, N-methyl-2-pyrrolidone/Toluene=80/20). After stirring at room temperature under a nitrogen atmosphere, 0.1595 mole (49.4389 g) of 4,4'-oxydiphthalic anhydride (ODPA) was batchwisely added into the reaction bottle with a time interval of 30 min. After the addition was completed, the reaction bottle mixture was stirred for 3 hrs, obtaining a polyamic acid resin solution with a solid content of 20%, wherein the molar ratio of the diamine and the dianhydride was 1:0.998.

PREPARATION EXAMPLE 2

0.0578 mole (6.2418 g) of p-phenylene diamine (P-PDA) and 0.1349 mole (26.971 g) of 4,4'-oxydianiline (4,4'-ODA) were added into a 1000 ml reaction bottle, and dissolved by a co-solvent of N-methyl-2-pyrrolidone and Toluene (425 g, N-methyl-2-pyrrolidone/Toluene=80/20). After stirring at room temperature under a nitrogen atmosphere, 0.1917 mole (41.7877 g) of pyromellitic dianhydride (PMDA) was batchwisely added into the reaction bottle with a time interval of 30 min. After the addition was completed, the reaction bottle mixture was stirred for 3 hrs, obtaining a polyamic acid resin solution with a solid content of 15%, wherein the molar ratio of the diamine and the dianhydride was 1:0.995.

Preparation of Polyimide Composition

PREPARATION EXAMPLE 3

8.57 g of boron nitride (particular size of 0.5 μm, sold and manufactured by Lower Friction with the trade No. MK-hBN-050) was mixed with n-methylpyrrolidone. Next, 100 g of the polyamic acid resin solution of Preparation Example 1 was stirred with boron nitride by a homogenizer at 2000 rpm for 30 min. Finally, the mixture was ground by a three-roller mill and defoamed by a high-speed defoamer, obtaining a polyimide composition (1). The boron nitride had a weight percentage of 30 wt %, based on the solid content of the polyimide composition (1).

In the disclosure, the polyimide composition (1) is used to form the first and third polyimide film of the polyimide film laminate.

PREPARATION EXAMPLE 4

5.0 g of boron nitride (particular size of 0.5 μm, sold and manufactured by Lower Friction with the trade No. MK-hBN-050) was mixed with n-methylpyrrolidone. Next, 100 g of the polyamic acid resin solution of Preparation Example 1 was stirred with boron nitride by a homogenizer at 2000 rpm for 30 min. Finally, the mixture was ground by a three-roller mill and defoamed by a high-speed defoamer, obtaining a polyimide composition (2). The boron nitride had a weight percentage of 20 wt %, based on the solid content of the polyimide composition (2).

In the disclosure, the polyimide composition (2) is used to form the first and third polyimide film of the polyimide film laminate.

PREPARATION EXAMPLE 5

2.2 g of boron nitride (particular size of 0.5 μm, sold and manufactured by Lower Friction with the trade No. MK-hBN-050) was mixed with n-methylpyrrolidone. Next, 100 g of the polyamic acid resin solution of Preparation Example 1 was stirred with boron nitride by a homogenizer at 2000 rpm for 30 min. Finally, the mixture was ground by a three-roller mill and defoamed by a high-speed defoamer, obtaining a polyimide composition (3). The boron nitride had a weight percentage of 10 wt %, based on the solid content of the polyimide composition (3).

In the disclosure, the polyimide composition (3) is used to form the first and third polyimide film of the polyimide film laminate.

PREPARATION EXAMPLE 6

100 g of the polyamic acid resin solution of Preparation Example 1 was stirred by a homogenizer at 2000 rpm for 30 min and defoamed by a high-speed defoamer, obtaining a polyimide composition (4). In the disclosure, the polyimide composition (4) is used to form the first and third polyimide film of the polyimide film laminate.

PREPARATION EXAMPLE 7

12.0 g of carbon fiber (vapor grown carbon fiber, sold and manufactured by Showa Denko with the trade No. VGCF-H) and 3.0 g of boron nitride (with a particular size of 5~6 μm, sold and manufactured by General Electric Company with the trade No PT180) were mixed with n-methylpyrrolidone, obtaining a mixture. Next, 100 g of the polyamic acid resin solution of Preparation Example 2 was stirred with the mixture by a homogenizer at 2000 rpm for 30 min and defoamed by a high-speed defoamer, obtaining a polyimide composition (5). The carbon fiber had a weight percentage of 40 wt % and the boron nitride had a weight percentage of 10 wt %, based on the solid content of the polyimide composition (5).

In the disclosure, the polyimide composition (5) is used to form the second polyimide film of the polyimide film laminate.

PREPARATION EXAMPLE 8

9.0 g of carbon fiber (vapor grown carbon fiber, sold and manufactured by Showa Denko with the trade No. VGCF-H) and 6.0 g of boron nitride (with a particular size of 5~6 μm, sold and manufactured by General Electric Company with the trade No PT180) were mixed with n-methylpyrrolidone, obtaining a mixture. Next, 100 g of the polyamic acid resin solution of Preparation Example 2 was stirred with the mixture by a homogenizer at 2000 rpm for 30 min and defoamed by a high-speed defoamer, obtaining a polyimide composition (6). The carbon fiber had a weight percentage of 30 wt % and the boron nitride had a weight percentage of 20 wt %, based on the solid content of the polyimide composition (6).

In the disclosure, the polyimide composition (6) is used to form the second polyimide film of the polyimide film laminate.

PREPARATION EXAMPLE 9

7.5 g of carbon fiber (vapor grown carbon fiber, sold and manufactured by Showa Denko with the trade No. VGCF-H) and 7.5 g of boron nitride (with a particular size of 5~6 μm, sold and manufactured by General Electric Company with the trade No PT180) were mixed with n-methylpyrrolidone, obtaining a mixture. Next, 100 g of the polyamic acid resin solution of Preparation Example 2 was stirred with the mixture by a homogenizer at 2000 rpm for 30 min and defoamed by a high-speed defoamer, obtaining a polyimide composition (7). The carbon fiber had a weight percentage of 25 wt % and the boron nitride had a weight percentage of 25 wt %, based on the solid content of the polyimide composition (7).

In the disclosure, the polyimide composition (7) is used to form the second polyimide film of the polyimide film laminate.

PREPARATION EXAMPLE 10

100 g of the polyamic acid resin solution of Preparation Example 2 was stirred by a homogenizer at 2000 rpm for 30 min and defoamed by a high-speed defoamer, obtaining a polyimide composition (8). In the disclosure, the polyimide composition (8) is used to form the second polyimide film of the polyimide film laminate.

PREPARATION EXAMPLE 11

15.0 g of boron nitride (particular size of 5~6 μm, sold and manufactured by General Electric Company with the trade No. PT180) was mixed with n-methylpyrrolidone. Next, 100 g of the polyamic acid resin solution of Preparation Example 2 was stirred with the boron nitride by a homogenizer at 2000 rpm for 30 min and defoamed by a high-speed defoamer, obtaining a polyimide composition (9). The boron nitride had a weight percentage of 50 wt %, based on the solid content of the polyimide composition (9).

In the disclosure, the polyimide composition (9) is used to form the second polyimide film of the polyimide film laminate.

Polyimide Film Laminate

EXAMPLE 1

First, the polyimide composition (1) of Preparation Example 3 was coated on a poly(ethylene terephthalate)) (PET) substrate with a thickness of 100 μm, and then baked at 100° C. for 20 min, obtaining a first polyimide layer. Next, the polyimide composition (5) of Preparation Example 7 was coated on the first polyimide layer, and then baked at 100° C. for 20 min, obtaining a second polyimide layer. Next, the polyimide composition (1) of Preparation Example 3 was coated on the second polyimide layer, and then baked at 100° C. for 20 min, obtaining a third polyimide layer. After removing the PET substrate, the multilayer film was fixed by a mold frame and subjected to a thermal cyclopolymerization at 350° C. for 60 min, obtaining a polyimide film laminate (1). The thickness of the first, second, and third polyimide layers and the components of the first, second, and third polyimide layers of the polyimide film laminate (1) are shown in Table 1.

EXAMPLE 2-10

Examples 2-10 were performed in the same manner as in Example 1 except that the thickness and components of the first, second, and third polyimide layers shown in Table 1, were used instead of those disclosed in Example 1, obtaining respective polyimide film laminates (2)-(10).

COMPARATIVE EXAMPLE 1

First, the polyimide composition (4) of Preparation Example 6 was coated on a poly(ethylene terephthalate)) (PET) substrate with a thickness of 100 μm, and then baked for 30 min, obtaining a first polyimide layer. Next, the polyimide composition (8) of Preparation Example 10 was coated on the first polyimide layer, and then baked at 100° C. for 20 min, obtaining a second polyimide layer. Next, the polyimide composition (4) of Preparation Example 6 was coated on the second polyimide layer, and then baked at 100° C. for 20 min, obtaining a third polyimide layer. After removing the PET substrate, the multilayer film was fixed by a mold frame and subjected to a thermal cyclopolymerization at 350° C. for 60 min, obtaining a polyimide film laminate (11). The thickness of the first, second, and third polyimide layers and the components of the first, second, and third polyimide layers of the polyimide film laminate (11) are shown in Table 1.

COMPARATIVE EXAMPLE 2

The polyimide composition (5) of Preparation Example 7 was coated on a poly(ethylene terephthalate)) (PET) substrate with a thickness of 100 μm. After pre-baking at 100° C. for 30 min, the obtained coating was peeled from the PET substrate, and then subjected to a thermal cyclopolymerization at 350° C. for 60 min, obtaining a polyimide film (1). The thickness and the components of the polyimide film (1) are shown in Table 1.

COMPARATIVE EXAMPLE 3

The polyimide composition (9) of Preparation Example 11 was coated on a poly(ethylene terephthalate)) (PET) substrate with a thickness of 100 μm. After pre-baking at 100° C. for 30 min, the obtained coating was peeled from the PET substrate, and then subjected to a thermal cyclopolymerization at 350° C. for 60 min, obtaining a polyimide film (2). The thickness and the components of the polyimide film (2) are shown in Table 1.

TABLE 1

|  | first layer (with a thickness of 7-8 μm) | | second layer (with a thickness of 20 μm) | | | third layer (with a thickness of 7-8 μm) | |
| --- | --- | --- | --- | --- | --- | --- | --- |
|  | polyimide resin (wt %) | boron nitride (wt %) | polyimide resin (wt %) | VG CF (wt %) | boron nitride (wt %) | polyimide resin (wt %) | boron nitride (wt %) |
| Polyimide film laminate (1) (Example 1) | 70 | 30 | 50 | 40 | 10 | 70 | 30 |
| Polyimide film laminate (Example 2) | 70 | 30 | 50 | 30 | 20 | 70 | 30 |

TABLE 1-continued

| | first layer (with a thickness of 7-8 μm) | | second layer (with a thickness of 20 μm) | | | third layer (with a thickness of 7-8 μm) | |
|---|---|---|---|---|---|---|---|
| | polyimide resin (wt %) | boron nitride (wt %) | polyimide resin (wt %) | VG CF (wt %) | boron nitride (wt %) | polyimide resin (wt %) | boron nitride (wt %) |
| Polyimide film laminate (3) (Example 3) | 70 | 30 | 50 | 25 | 25 | 70 | 30 |
| Polyimide film laminate (4) (Example 4) | 80 | 20 | 50 | 40 | 10 | 80 | 20 |
| Polyimide film laminate (5) (Example 5) | 80 | 20 | 50 | 30 | 20 | 80 | 20 |
| Polyimide film laminate (6) (Example 6) | 80 | 20 | 50 | 25 | 25 | 80 | 20 |
| Polyimide film laminate (7) (Example 7) | 90 | 10 | 50 | 40 | 10 | 90 | 10 |
| Polyimide film laminate (8) (Example 8) | 90 | 10 | 50 | 30 | 20 | 90 | 10 |
| Polyimide film laminate (9) (Example 9) | 90 | 10 | 50 | 25 | 25 | 90 | 10 |
| Polyimide film laminate (10) (Example 10) | 100 | 0 | 50 | 40 | 10 | 100 | 0 |
| Polyimide film laminate (11) (Comparative Example 1) | 100 | 0 | 100 | 0 | 0 | 100 | 0 |
| Polyimide film (1) (Comparative Example 2) | 0 | 0 | 50 | 40 | 10 | 0 | 0 |
| Polyimide film (2) (Comparative Example 3) | 0 | 0 | 50 | 0 | 50 | 0 | 0 |

Measurement of the Polyimide Film Laminate

Next, the thermal conductivity, breakdown voltage, flexibility, and hygroscopicity of the polyimide film laminates (1)-(11), polyimide films (1)-(2), and a commercially available polyimide film (sold and manufactured by Dupont with the trade No. Kapton MT) were measured as below. The results are shown in Table 2.

The thermal conductivity was determined according to the Iso/DIS22007 2.2 test method using a Hot-Disk-2500 module system.

The breakdown voltage was determined according to ASTM D149 test method using a withstanding voltage tester (Model 730-1). Further, the term breakdown voltage, is the voltage at which electric failure occurs when a potential difference is applied to an electrically insulating material.

The hygroscopicity was measured according to the IPC-TM-650 2.6.2 test method. First, the polyimide test sample (10 cm×10 cm) was baked at 110° C. for 60 min and had a weight W1. Next, the polyimide test sample was bathed in DI water for 24 hr. After drying, the obtained polyimide test sample had a weight W2. The hygroscopicity was evaluated by the following equation:

$$\text{hygroscopicity}(\%) = \frac{W_2 - W_1}{W_1} \times 100$$

The flexibility was measured by taking opposite corners of the printed rectangles, and folding them to form a rectangle, which was half of the original size, bringing the two inside faces in contact with each other with finger pressure. After repeating the above step 10 times, the presence or absence of cracks was recorded.

TABLE 2

| | thermal conductivity (W/m*k) | breakdown voltage(KV) | Flexibility | hygroscopicity(%) |
|---|---|---|---|---|
| Polyimide film laminate (1) (Example 1) | 2.8 | 3.2 | No crack | 0.87 |

TABLE 2-continued

| | thermal conductivity (W/m*k) | breakdown voltage(KV) | Flexibility | hygro-scopicity(%) |
|---|---|---|---|---|
| Polyimide film laminate (Example 2) | 2.5 | 3.4 | No crack | 0.91 |
| Polyimide film laminate (Example 3) | 2.1 | 3.5 | No crack | 0.95 |
| Polyimide film laminate (4) (Example 4) | 2.6 | 3.3 | No crack | 0.95 |
| Polyimide film laminate (5) (Example 5) | 2.0 | 3.4 | No crack | 0.98 |
| Polyimide film laminate (6) (Example 6) | 1.8 | 3.6 | No crack | 1.02 |
| Polyimide film laminate (7) (Example 7) | 2.3 | 3.4 | No crack | 0.97 |
| Polyimide film laminate (8) (Example 8) | 2.1 | 3.5 | No crack | 0.93 |
| Polyimide film laminate (9) (Example 9) | 1.7 | 3.8 | No crack | 1.05 |
| Polyimide film laminate (10) (Example 10) | 1.5 | 3.6 | No crack | 1.20 |
| Polyimide film laminate (11) (Comparative Example 1) | 0.2 | 5.0 | No crack | 1.35 |
| Polyimide film (1) (Comparative Example 2) | 3.5 | 0.2 | No crack | 1.02 |
| Polyimide film (2) (Comparative Example 2) | 0.8 | 4.8 | broken | 0.95 |
| Kapton MT | 0.37 | 4.5 | No crack | — |

Since the middle layer (second polyimide layer) includes high thermal conductive carbon material, the polyimide film laminate of the disclosure exhibited high thermal conductivity. Further, the outside layers (the first and third polyimide layers) exhibited a high voltage breakdown resistance polyimide film, thereby ensuring the insulation characteristics of the polyimide film laminate. Therefore, the polyimide film laminate exhibited high thermal conductivity and insulation characteristics, and can be employed by low-volume devices with high heat dissipation requirements.

It will be apparent to those skilled in the art that various modifications and variations can be made to the disclosed embodiments. It is intended that the specification and examples be considered as exemplary only, with a true scope of the disclosure being indicated by the following claims and their equivalents

What is claimed is:

1. A polyimide film laminate, comprising:
a first polyimide film, wherein the first polyimide film has a thermal conductivity of between about 0.2-0.9 watts/m·K and a breakdown voltage greater than about 3 KV;
a second polyimide film formed on the first polyimide film, wherein the second polyimide film has a thermal conductivity of more than about 1 watts/m·K; and
a third polyimide film formed on the second polyimide film, wherein the third polyimide film has a thermal conductivity of between about 0.2-0.9 watts/m·K, and has a breakdown voltage greater than about 3 KV.

2. The polyimide film laminate as claimed in claim 1, wherein the first polyimide film and the third polyimide film respectively comprises a polyimide resin.

3. The polyimide film laminate as claimed in claim 1, wherein the first polyimide film and the third polyimide film respectively comprises a thermal conductive filler, wherein the thermal conductive filler comprises boron nitride, aluminium nitride, or aluminium sesquioxide, or combinations thereof.

4. The polyimide film laminate as claimed in claim 3, wherein the thermal conductive filler has a weight percentage of 0.1-60 wt %, based on the total weight of the polyimide resin and the thermal conductive filler.

5. The polyimide film laminate as claimed in claim 1, wherein the second polyimide film comprises a polyimide resin, a thermal conductive carbon material and a thermal conductive filler, wherein the thermal conductive carbon material comprises a nanotube, carbon fiber, graphite, and the thermal conductive filler comprises boron nitride, aluminium nitride, or aluminium sesquioxide, or combinations thereof.

6. The polyimide film laminate as claimed in claim 5, wherein the weight percentage of the thermal conductive carbon material and the thermal conductive filler is 10-50 wt %, based on the weight of the second polyimide film.

7. The polyimide film laminate as claimed in claim 5, wherein the weight ratio of between the thermal conductive filler and the thermal conductive carbon material is between 10:90 and 50:50.

8. The polyimide film laminate as claimed in claim 5, wherein the thermal conductive carbon material is vapor grown carbon fiber (VGCF).

9. The polyimide film laminate as claimed in claim 1, wherein the first polyimide film has a thickness T1, the second polyimide film has a thickness T2, and the third polyimide film has a thickness T3, wherein the thickness T1, thickness T2, and thickness T3 are defined by the following equations: $0.5<T2/T1<10$, and $0.5<T2/T3<10$.

10. The polyimide film laminate as claimed in claim 9, wherein the thickness T1 of the first polyimide film is 7-20 μm, and the thickness T3 of the third polyimide film is 7-20 μm.

11. The polyimide film laminate as claimed in claim 9, wherein the polyimide film laminate has a thickness of less than 60 μm.

12. A metal clad laminate, comprising:
a first metal layer; and
the polyimide film laminate as claimed in claim 1 disposed on the first metal layer.

13. The metal clad laminate as claimed in claim 12, further comprising:
a second metal layer, disposed on the polyimide film laminate.

14. The metal clad laminate as claimed in claim 13, wherein the first metal layer and the second metal layer respectively comprise copper foil, aluminum foil, stainless steel foil, or nickel foil.

15. The metal clad laminate as claimed in claim 14, wherein the metal clad laminate is a double-sided flexible copper clad laminate.

16. The metal clad laminate as claimed in claim 12, wherein the first polyimide film of the polyimide film laminate has a thickness T1, the second polyimide film of the polyimide film laminate has a thickness T2, and the third polyimide film of the polyimide film laminate has a thickness T3, wherein the thickness T1, thickness T2, and thickness T3 are defined by the following equations: 0.5<T2/T1<10, and 0.5<T2/T3<10.

17. The metal clad laminate as claimed in claim 16, wherein the thickness T1 of the first polyimide film is 7-20 μm, and the thickness T3 of the third polyimide film is 7-20 μm.

18. The metal clad laminate as claimed in claim 16, wherein the polyimide film laminate has a thickness of less than 60 μm.

* * * * *